(No Model.) 6 Sheets—Sheet 1.
J. A. WOODBURY, J. MERRILL, G. PATTEN & E. F. WOODBURY.
HOT AIR ENGINE.
No. 324,061. Patented Aug. 11, 1885.
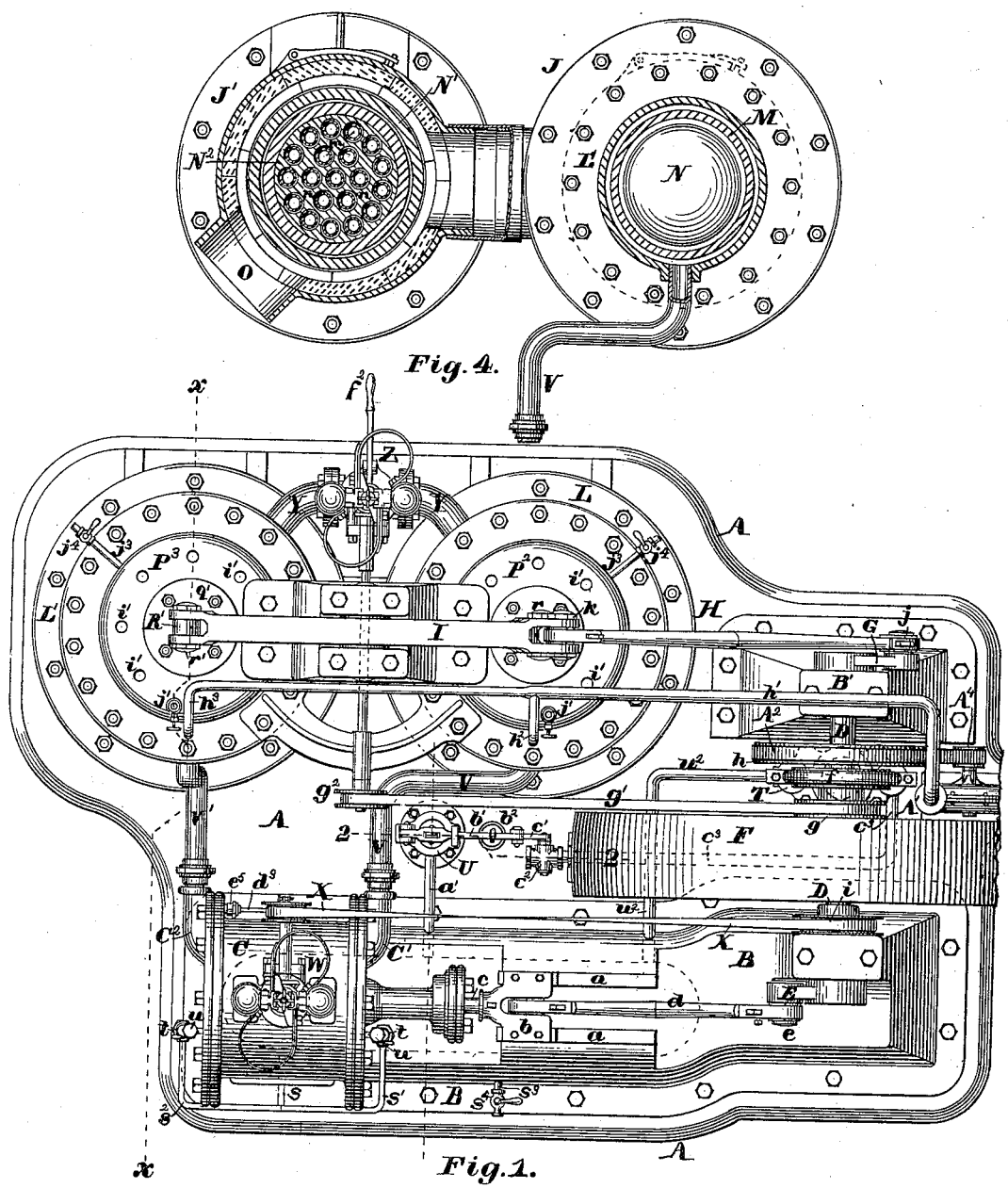
Witnesses:
E. A. Hemmenway
Walter E. Lombard
Inventors:
James A. Woodbury,
Joshua Merrill,
George Patten,
Edward F. Woodbury,
by N. C. Lombard,
Attorney.

(No Model.) 6 Sheets—Sheet 2.

J. A. WOODBURY, J. MERRILL, G. PATTEN & E. F. WOODBURY.
HOT AIR ENGINE.

No. 324,061. Patented Aug. 11, 1885.

Witnesses:
E. A. Hemmenway
Walter E. Lombard

Inventors:
James A. Woodbury,
Joshua Merrill,
George Patten,
Edward F. Woodbury,
by N. C. Lombard
Attorney.

(No Model.) 6 Sheets—Sheet 3.

J. A. WOODBURY, J. MERRILL, G. PATTEN & E. F. WOODBURY.
HOT AIR ENGINE.

No. 324,061. Patented Aug. 11, 1885.

Witnesses:
E. A. Hemmenway
Walter E. Lombard

Inventors:
James A. Woodbury,
Joshua Merrill,
George Patten,
Edward F. Woodbury,
by N. C. Lombard
Attorney.

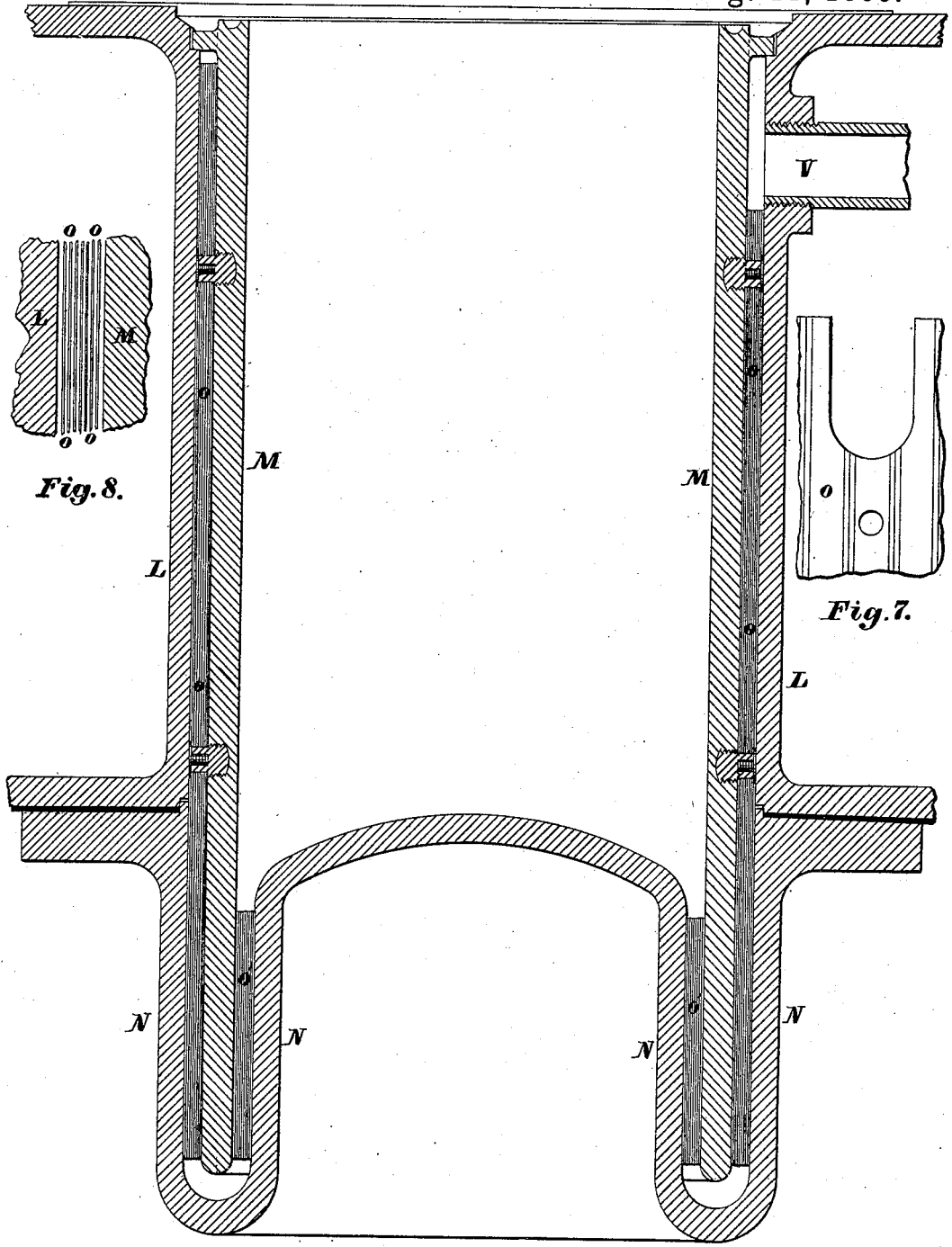

(No Model.) 6 Sheets—Sheet 6.

J. A. WOODBURY, J. MERRILL, G. PATTEN & E. F. WOODBURY.
HOT AIR ENGINE.

No. 324,061. Patented Aug. 11, 1885.

Witnesses:
E. A. Hemmenway
Walter E. Lombard

Inventors:
James A. Woodbury,
Joshua Merrill,
George Patten,
Edward F. Woodbury,
by N. C. Lombard
Attorney.

UNITED STATES PATENT OFFICE.

JAMES A. WOODBURY, JOSHUA MERRILL, GEORGE PATTEN, AND EDWARD FRANK WOODBURY, OF BOSTON, MASSACHUSETTS.

HOT-AIR ENGINE.

SPECIFICATION forming part of Letters Patent No. 324,061, dated August 11, 1885.

Application filed April 4, 1881. (No model.)

*To all whom it may concern:*

Be it known that we, JAMES A. WOODBURY, JOSHUA MERRILL, GEO. PATTEN, and EDWARD F. WOODBURY, all of Boston, in the county of Suffolk and State of Massachusetts, have invented certain new and useful Improvements in Hot-Air Engines, of which the following, taken in connection with the accompanying drawings, is a specification.

Our invention relates to that class of air-engines which are operated by alternately heating and cooling the same body of air over and over again, and to that particular kind of such engines in which a working cylinder and piston are used in combination with one or two reversers in which air may be used under a pressure greater than that of the atmosphere; and it consists in certain combinations and arrangements of parts and details of construction, which will be best understood by reference to the description of the drawings, and to the claims to be hereinafter given.

Figure 14:
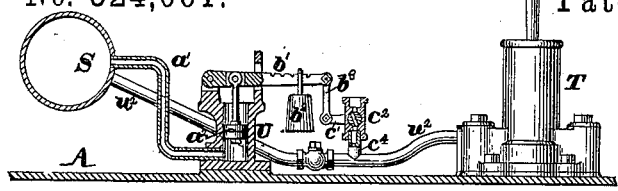
Figure 15:
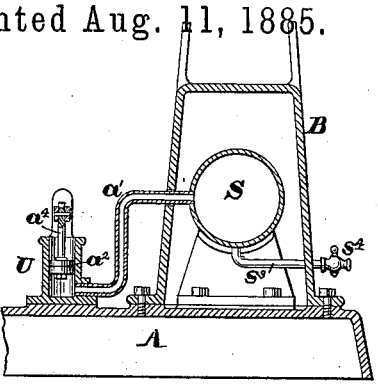
Figure 2:
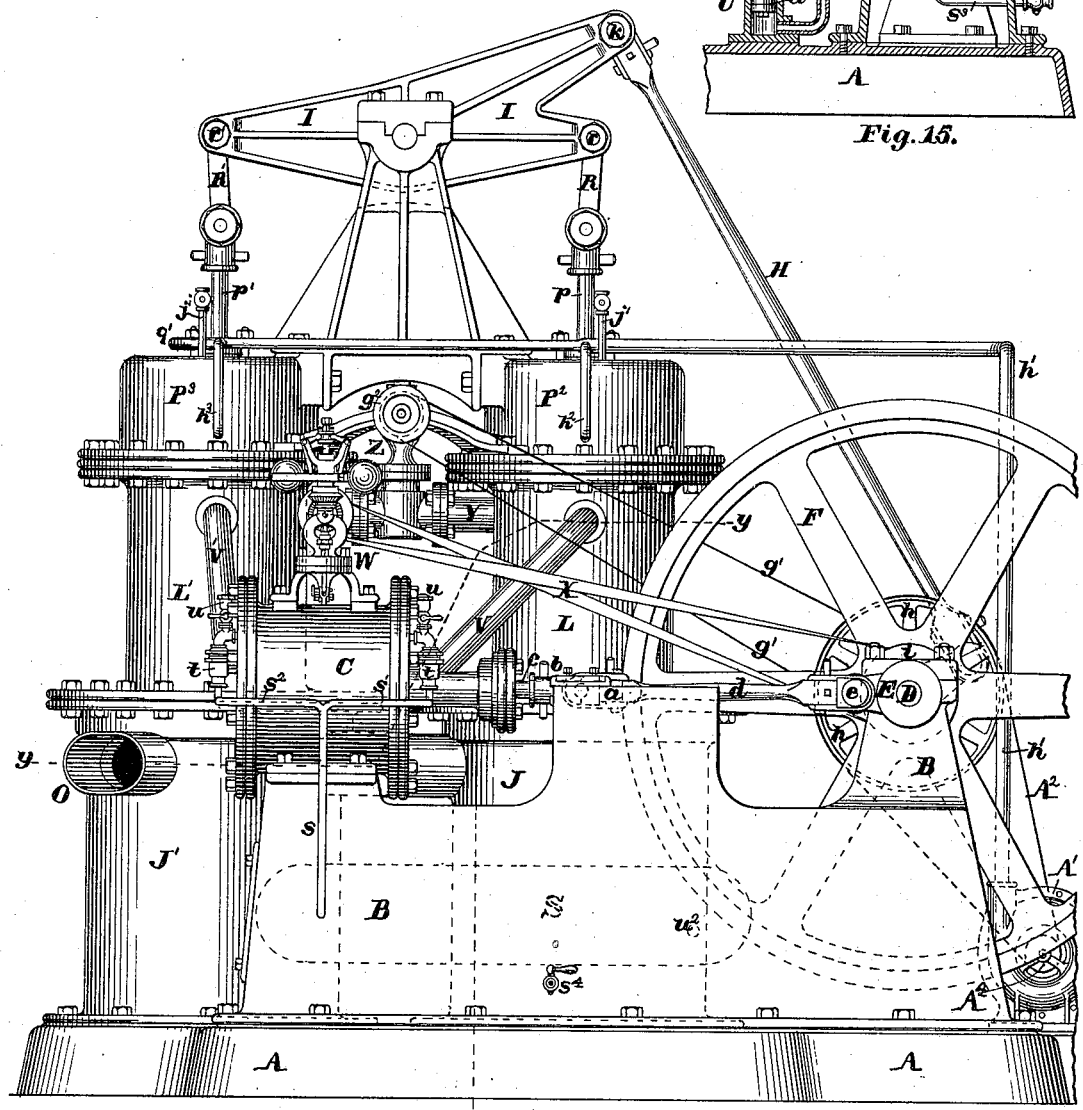
Figure 13:
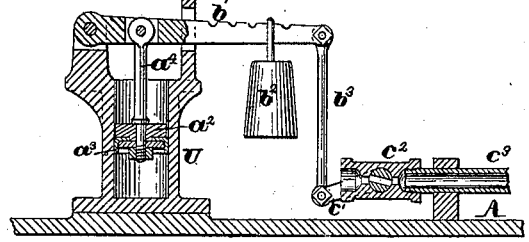
Figure 5:
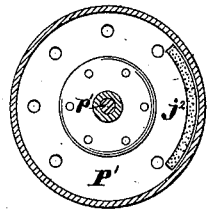
Figure 3:
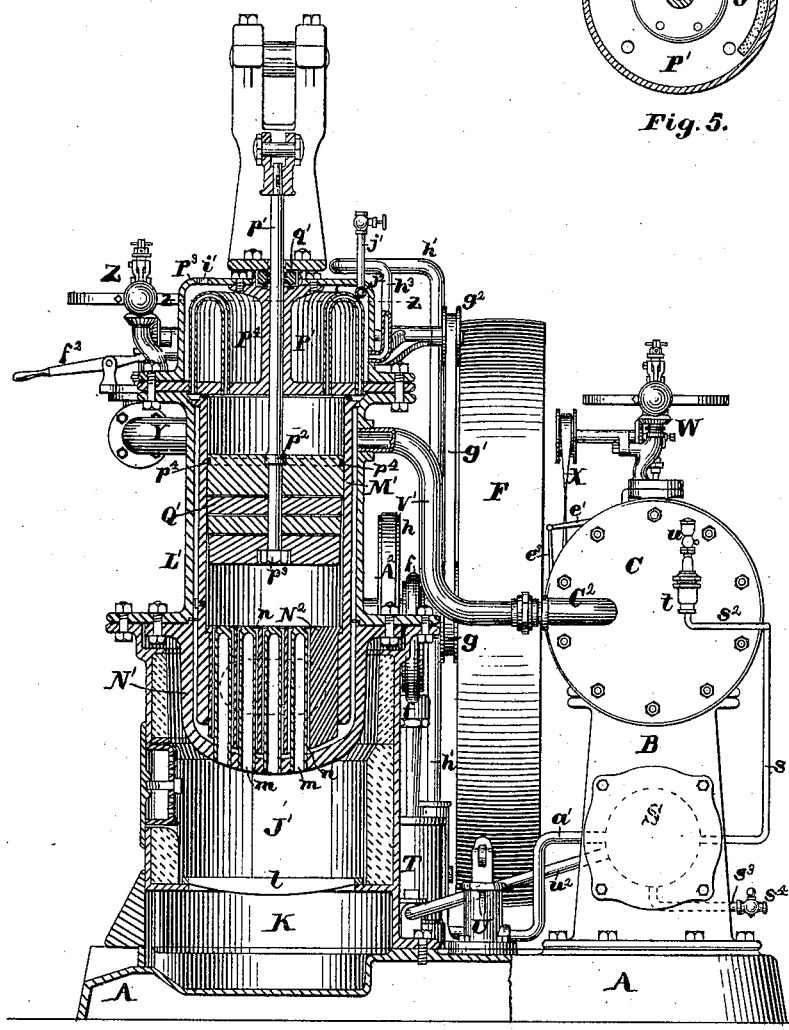
Figures 9, 10:
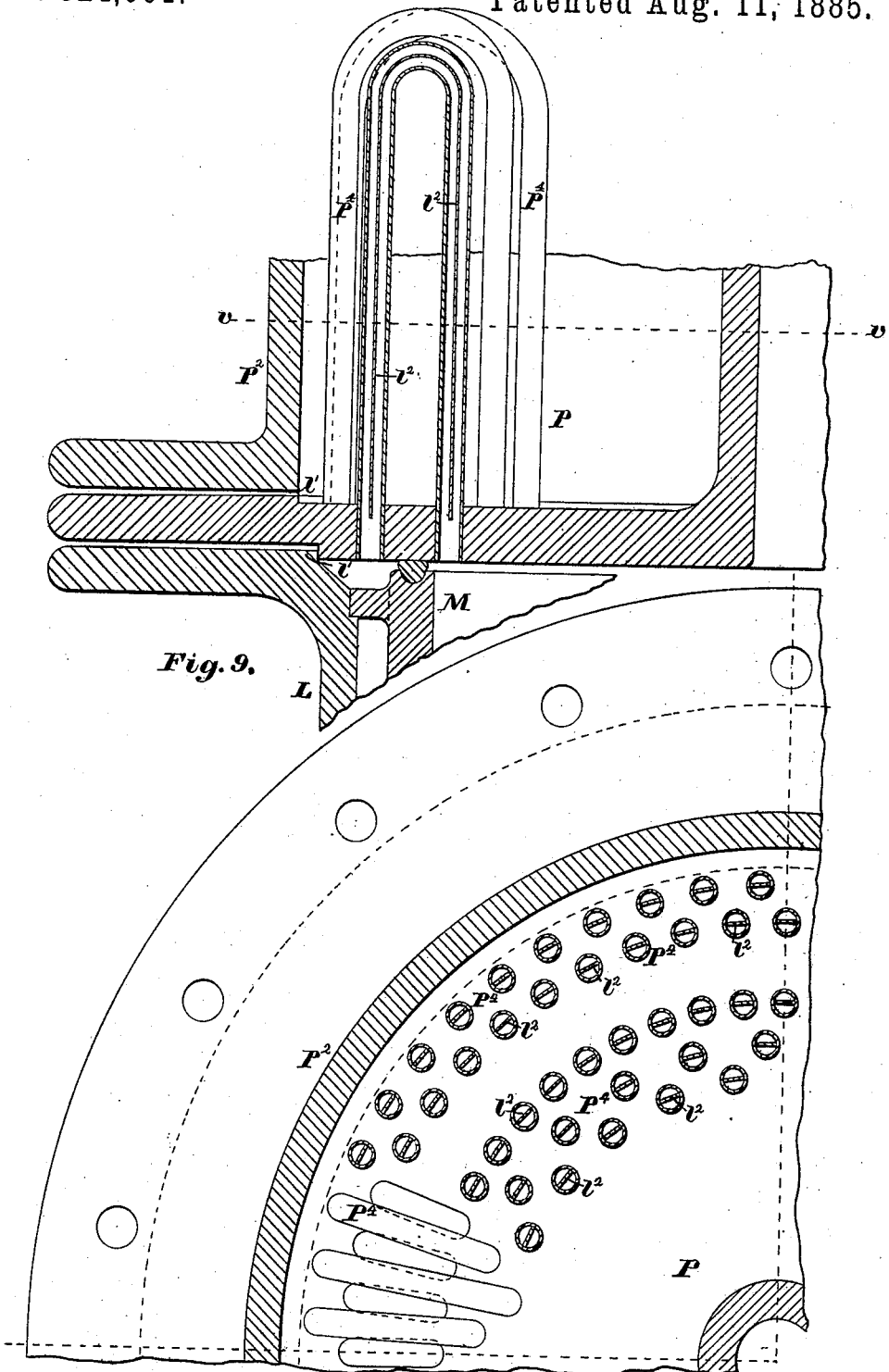
Figure 12:
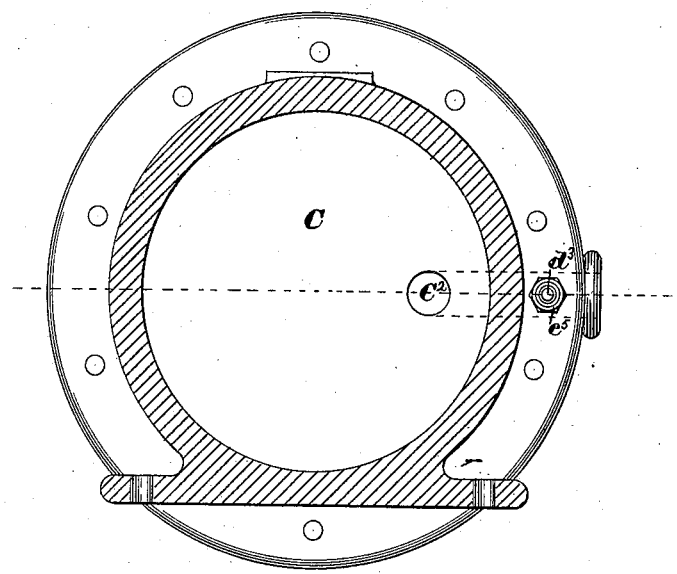
Figure 11:
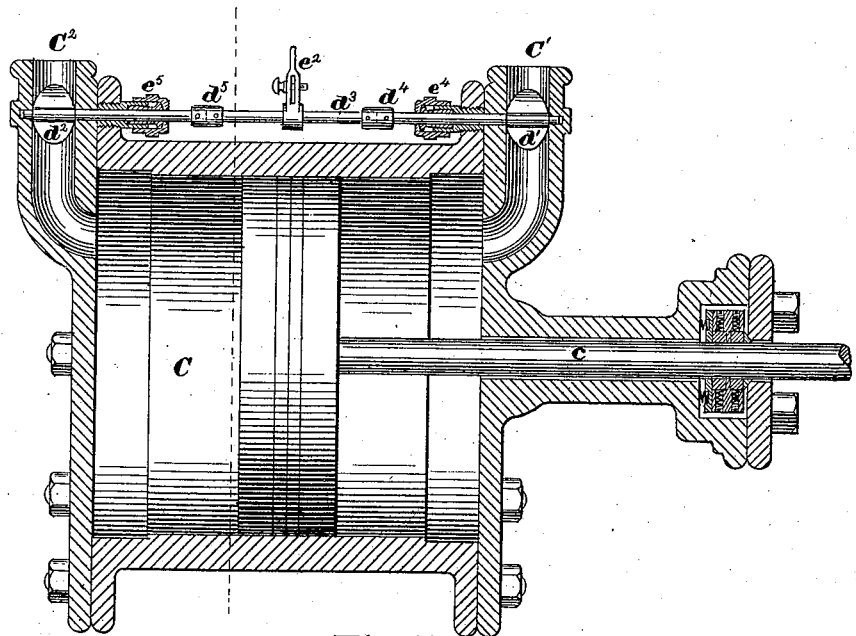

Figure 1 of the drawings is a plan of an air-engine embodying our invention. Fig. 2 is a side elevation. Fig. 3 is a vertical transverse sectional elevation, the cutting-plane being on line $x\,x$ on Fig. 1, looking toward the fly-wheel. Fig. 4 is a partial horizontal section on line $y\,y$ on Fig. 2. Fig. 5 is a horizontal section through cooler-casing on line $z\,z$ on Fig. 3, looking upward. Fig. 6 is a central vertical section through the reverser-cylinder and heater with the cooler removed, drawn to an enlarged scale. Fig. 7 is an elevation of a small portion of one of the regenerator plates contiguous to the air-pipe leading to the working-cylinder. Fig. 8 is a section of a small portion of the reverser-cylinder, drawn to a scale two and one-half times larger than Fig. 6. Fig. 9 is a partial vertical section of the cooler, showing a few of its tubes in elevation. Fig. 10 is a sectional plan of same, the cutting-plane being on line $v\,v$ on Fig. 9. Figs. 11 and 12 are respectively a horizontal longitudinal section and a vertical transverse section of the working-cylinder, drawn to an enlarged scale. Fig. 13 is a vertical section through pump-regulating mechanism on line 2 2 on Fig. 1. Fig. 14 is a similar section, showing a modification of the pump-regulating mechanism; and Fig. 15 is a transverse vertical section through the tank and inclosing-stand.

A is the bed-plate, upon which are mounted all the parts of the engine.

B is a frame or stand bolted to the bed-plate A and provided at one end with a seat for the working-cylinder C, and at its other end with a bearing for one end of the shaft D, the opposite end of which has its bearing in the stand B', as shown in Fig. 1.

Upon the central portion of the frame or stand B are formed two slides, $a\,a$, to receive the cross-head $b$, secured to the outer end of the piston-rod $c$, and to which is pivoted one end of the connecting-rod $d$, the opposite end of which embraces the crank-pin $e$ of the crank E, secured upon one end of the shaft D, as shown. The shaft D has mounted thereon the fly-wheel F, eccentric $f$, and pulleys $g$, $h$, and $i$, and has secured to its rear end the crank G, provided with a crank-pin, $j$, which is embraced by one end of the connecting-rod H, the upper end of which is pivoted to the beam I at $k$, as shown in Figs. 1 and 2.

J and J' are two furnaces provided with grates $l$, and with the ash-pit K beneath the same. To the upper ends of the furnaces J and J' are bolted the regenerator-cylinders L and L', respectively, within which, and suspended therefrom by suitable lugs at the top are placed the reverser-cylinders M and M', respectively, said reverser-cylinders being of such a diameter relative to the regenerator-cylinders that an annular space is formed between them, which extends from the top to the bottom of the regenerator-cylinder, the reverser-cylinders M and M' extending downward some distance below the bottom of the regenerator-cylinder, as shown in Fig. 3.

To the lower ends of the regenerator-cylinders L and L' are bolted the heaters N and N', respectively, which depend therefrom and inclose the lower ends of the reverser-cylinders M and M' in such a manner as to form a continuation of the annular space around the reverser-cylinder, as shown in Figs. 3 and 6.

Beneath the reverser-cylinder M we prefer to use the annular heater N, constructed as shown in Fig. 6, while beneath the reverser-cylinder M' we use a heater of different construction, as shown in Fig. 3, for the purpose of enabling us to obtain the greatest effect from the combustion of the fuel when running a single fire beneath the heater N, from which the hot gases and products of combustion pass through the furnace J', impinging upon and passing around and beneath the heater N' and escaping to the chimney through the outlet O. The heater N' has set in its bottom the open ends of a series of upwardly-projecting tubes, $m$ $m$, the upper ends of which are closed, said tubes passing through and partially filling the vertical cylindrical openings $n$ $n$ through the filling-block N², which is suspended from a shoulder formed upon the interior of the reverser-cylinder M' by means of the outwardly-projecting lip or flange formed around the upper part of said block, the lower end of said block reaching to within a short distance of the upper surface of the bottom of the heater N', but not touching it, so that the air may pass freely through the annular passages, $n$ $n$, between the bottom of the block N² and the heater N', and through the annular space between the regenerator and reverser cylinders to the cooler, or vice versa.

To the upper ends of the regenerator-cylinders L and L' are secured the tubular coolers P and P' and their casings P² and P³, respectively, all constructed and arranged substantially as described in a previous patent granted to us.

The annular space surrounding the reverser-cylinder and between it and the regenerator-cylinder and the inner wall of the heater is filled from end to end of the reverser-cylinder with a series of thin metallic plates, $o$, of about one sixty-fourth of an inch in thickness, each of said plates being provided with vertical corrugations at intervals, and of such a depth that eight plates will fill a space about three-eighths of an inch wide, having spaces between them extending from one end to the other of the reverser-cylinder, through which the air must pass from the space beneath the reverser-piston to reach the space above said piston, or vice versa. The annular space between the lower portion of the reverser-cylinder M and the inner vertical wall of the heater N is also filled with similar plates, $o'$, as shown in Fig. 6.

The plates $o$, extending downward to the lower end of the reverser-cylinder, and between it and the outer wall of the heater, and the plates $o'$ in the space between the lower portion of the reverser-cylinder and the inner vertical wall of the heater N constitute important features of our present invention.

Q' is the reverser-piston, made up of several disks of metal, all firmly secured together and to the piston-rod $p'$ by being clamped between the collar $p^2$ and the nut $p^3$, a gasket of asbestus being placed between said disks as a means of preventing or retarding the transmission of heat toward the top of said piston. The upper one of said disks is made to fit the bore of the cylinder, and is provided with an annular groove near its upper end, in which is placed a metallic packing ring, $p^4$, as shown.

The piston-rod $p'$ passes through a long bearing in the central hub of the cooler P' and the stuffing-box $q'$, and is connected by the link R' to the beam I at $r'$. A similar piston in the reverser-cylinder M is similarly connected to the beam I at $r$ by the connecting rod or link R and piston-rod $p$, as shown in Fig. 2.

S is a tank or receiver located in the hollow of the frame or stand B, and connected by the pipes $s$, $s'$, and $s^2$ with the opposite ends of the working-cylinder C, the pipes $s'$ and $s^2$ being each provided with a check-valve, $t$, to prevent the return of air from the working-cylinder, and also with an oil cup, $u$, by means of which oil may be introduced into said pipes $s'$ and $s^2$, and be carried into the cylinder C with every draft of air from the tank to the working-cylinder, all as shown in Figs. 2 and 3.

The tank is filled with compressed air by means of the air-pump T, the plunger of which is operated by the eccentric $f$, and which discharges through the pipe $u^2$ into the tank S, the lower end of said pump being provided with suitable inlet and outlet valves, which act automatically in a well-known manner.

The pressure in the tank S should be maintained at a given and uniform pressure, and to this end we may use a safety-valve on the tank, or upon the pipe leading from the pump to the cylinder, when a tank is not used; but this arrangement involves a considerable loss of power, from the fact that the pump has to be worked at all times against a pressure equal to that in the tank or engine, and as the pump only has to supply the loss of air by leakage, after the desired pressure is once obtained, it follows that there are times when the working of the pump is unnecessary, and if worked at such times the power required to work said pump against the pressure of two or more atmospheres is wasted; but as it is not convenient if practical, to automatically stop and start the pump at the desired times, we attain substantially the same end in the following manner:

We erect upon the bed plate, at any convenient point, a cylinder, U, connected at its lower end by a suitable pipe, $a'$, to the tank S, or to a pipe leading from the pump to said tank, or from the tank to the cylinder between said tank and the check-valves $t$ $t$; or, in case no tank is used, said pipe may connect with a pipe leading from the pump to the cylinders and between said pump and the check-valves outside of the cylinders, said cylinder, U, having fitted thereto a piston, $a^2$, provided with a cupped leather packing, $a^3$, and connected by the piston-rod $a^4$ to the pivoted lever $b'$, upon which is suspended the adjustable weight $b^2$. The lever $b'$ is connected by the rod $b^3$ to a lever, $c'$, secured to the plug-cock $c^2$, all the parts being so arranged that when the pressure in the tank or in the pipe leading from the air-pump to the cylinders is below a given pressure, to which the weight $b^2$ is adjusted, the plug-cock $c^2$ shall be wide open, said cock communicating with the inlet-valve of the air-pump through the pipe $c^3$, and the pump will continue to draft air and force it into the tank or cylinders. When, however, the pressure in the tank or the pipe leading from the pump to the cylinders rises above the point to which the weight $b^2$ is adjusted, the pressure acting upon the under side of the piston $a^2$ causes it to move upward in the cylinder U, and raises the free end of the lever $b'$, and through the rod $b^3$, acting upon the lever $c'$, turns the cock $c^2$ and closes the inlet to the pump, when the pump, continuing to operate, but not drafting any air, will work in a partial vacuum, requiring little or no power to operate it beyond what is required to overcome the friction of the parts.

The reverser-cylinders M and M' are connected by means of the pipes V and V', respectively, to the opposite ends of the working-cylinder C, said pipes opening from the upper portions of the regenerator-spaces in each of the reversers, as shown in Fig. 3. These pipes connect with passages $C'$ and $C^2$, cast in the heads of the working-cylinder, in which passages are mounted the throttle-valves $d'$ and $d^2$, respectively, secured upon and adapted to be rotated by the shaft $d^3$, acted upon by the governor W, through the medium of the levers $e'$ and $e^2$ and rod $e^3$. The shaft $d^3$ is made in three pieces, connected together by the coupling-sleeves $d^4$ $d^5$, and passes through stuffing-boxes $e^4$ and $e^5$, all as shown in Fig. 11.

The governor W is set in motion by the belt X, which leads from the governor-pulley to and around a pulley, $g$, on the crank-shaft D. The two regenerator-spaces which surround the reverser-cylinders M and M' are connected by the pipe Y, which is provided with a valve, by means of which communication between said cylinders may be opened or closed at will, either by hand by means of the hand-lever $f^2$, or automatically by the action of the governor Z, which is operated by the belt $g'$, leading from the pulley $g^2$ on the governor-shaft to the pulley $g$ on the crank-shaft D. When it is desired to operate the valve in the pipe Y by hand, the governor may be disconnected; or, if desired, a second pipe and valve may be used for slowing or stopping the engine by hand.

The governors shown are what are known as the "Waters' governor," and the valve in the pipe Y may be a Waters' valve; or a plug-cock or other valve may be used, as may also other forms of governors. The throttle-valves $d'$ and $d^2$ and the valve in the pipe Y may be operated by a single governor, if desired.

A' is a blower operated by the belt $A^2$, leading from the large pulley $h$ on the crank-shaft D to and around the small pulley $A^4$ on the blower-shaft, the office of said blower being to cause the circulation of a current of air through the pipes $h'$, $h^2$, and $h^3$ and through the coolers P and P', for the purpose of cooling the air contained in or passing through the pipes $P^4$ of said coolers, the air being used for the purpose instead of water, as heretofore practiced, the casings of the coolers being provided with one or more openings, $i'$, for the escape of the air therefrom, whereby a complete circulation may be kept up.

To aid the cooling process we propose to discharge into the cooler a small quantity of water in the form of fine spray, to which end we have shown the pipe $j'$, which may be connected at its outer end to any suitable supply or head of water, and communicates at its inner end with the pipe $j^2$, having both of its ends closed and provided with a series of fine perforations, through which the water is discharged into the cooler in the form of fine spray, a pipe, $j^3$, and cock $j^4$, being provided through which any water that accumulates in the cooler may be drawn off.

If desired, the pipes $j$ may communicate with the pipes $h^2$ and $h^3$, and the water be discharged into said pipes in the form of spray, and be carried into the cooler by the blast of air passing through said pipes.

The tank S is provided with a pipe, $s^3$, and cock $s^4$, through which any water accumulating in said tank on account of the condensation of the moisture in the air may be drawn off.

The bent or ∪-shaped tubes $P^4$ in the coolers P and P' are each divided longitudinally into two parts or distinct passages of a semicircular cross-section by means of the central partitions, $l^2$, as shown in Figs. 9 and 10, for the purpose of reducing the size of the column of air and more effectually extracting the heat therefrom.

This improvement is equally applicable to tubular heaters of similar construction as the coolers for the purpose of facilitating the transmission of heat to the air passing through said tubes.

The air-pump T is so located relative to the fly-wheel F that the current of air set in motion by the revolution of the fly-wheel strikes upon and circulates around the air-pump and keeps it cool.

The mechanism for automatically relieving the air-pump of its labor may be connected to a valve or cock communicating with the discharge-pipe of the pump, as shown in Fig. 14, where $c^2$ is the valve or cock, and $c^4$ a pipe communicating with the discharge of the air-pump. With this modification in operation the air-pump will draw air all the time and will force it into the tank or engine until the desired pressure is reached, when the cock $c^2$ is opened and the pump will discharge into the atmosphere.

What we claim as new, and desire to secure by Letters Patent of the United States, is—

1. A series of plates filling the annular space between the reverser-cylinder and the regenerator-cylinder and extending to the lower part of the heater, substantially as described.

2. In an air-engine, the combination of a heater, a cylinder extending into said heater, and a series of plates placed in the space or spaces between said cylinder and heater, substantially as described.

3. In an air-engine provided with one or more reverser-cylinders, a reverser-piston provided with a packing-ring, substantially as described.

4. The combination of the working-cylinder C, the air-pump T, the air-pipes $s$ $s'$ and $s^2$, and the check-valves $t$ $t$, all arranged and adapted to operate substantially as and for the purposes described.

5. In an air-engine arranged to use the same body of air over and over without exhausting it, the combination of a working cylinder, a reverser, a heater, a cooler, and means of circulating air around said cooler, substantially as described.

6. In an air-engine, the combination of a working-cylinder, two reverser-cylinders connected by suitable pipes with the working-cylinder, a heater, and a furnace or other means of applying heat beneath each of said reverser-cylinders, a passage from the furnace beneath one reverser-cylinder to the space beneath the other reverser-cylinder, and a passage thence to the chimney, all arranged and adapted to operate substantially as and for the purposes described.

7. As a means of slowing, stopping, or regulating an air-engine, the combination of two reverser-cylinders, a pipe connecting said cylinders, and a valve in said pipe arranged and adapted to control and regulate the passage of air from one cylinder to the other, substantially as described.

8. In an air-engine provided with a double-acting working-cylinder and two reverser-cylinders, a pipe or passage-way arranged to permit communication between the chambers at the ends of the working-piston, in combination with a valve arranged in and adapted to open and close said passage, as a means of regulating, slowing, or stopping the engine, substantially as described.

9. In an air-engine, the combination of two reverser-cylinders connected by a pipe, a valve adapted to close the passage through said pipe, and a governor connected with and adapted to operate said valve, as a means of regulating the speed of the engine, by controlling the difference in the pressure acting upon the ends of the working piston, substantially as described.

10. In an air-engine, the combination of a working-cylinder, two reverser-cylinders, a pipe connecting said reverser-cylinders, a valve in said pipe, a governor connected to and adapted to operate said valve, and a second governor connected to and operating a throttle-valve to regulate the admission of air to the working-cylinder, substantially as described.

11. In an air-engine, a heater provided with a series of tubes having their upper ends closed and their lower ends opening into the combustion chamber, substantially as described.

12. In an air engine, a heater provided with a series of tubes having their upper ends closed and their lower ends opening into the combustion-chamber, in combination with a filling-block provided with corresponding openings to receive said tubes and form annular spaces around the same for the passage of air from one end of the reverser-cylinder to the other, substantially as described.

13. In an air-engine, the combination of a heater and a filling-block provided with a series of holes extending from its upper to its lower side, and arranged within said heater and in such a relation to its bottom as to form a space between said block and the heater-bottom for the passage of air, substantially as described.

14. The combination, in an air-engine, of a working-cylinder, a reverser-cylinder, and a regenerator-cylinder, arranged, as set forth, to form an annular regenerator-space between them, and a pipe leading from the upper end of the regenerator-space to the working-cylinder, substantially as described.

15. In an air engine, a cooler or heater composed of a series of tubes, each divided longitudinally by a partition, substantially as described.

16. In an air-engine operated by compressed air, mechanism for automatically controlling the passage of air to or from the air-pump, so that whenever the air in the engine or receiver is raised to the desired pressure the pump shall be relieved from the labor due to compressing the air, substantially as described.

17. In an air-engine operated by compressed air, the combination of the air-pump T, the cylinder U, connected through the pipe $a'$ with the air-pump, the piston $a^2$, rod $a^4$, lever $b'$, weight $b^2$, lever $c'$, and cock or valve $c^2$, all arranged and adapted to operate substantially as and for the purposes described.

Executed at Boston, Massachusetts, this 1st day of April, A. D. 1881.

JAMES A. WOODBURY.
JOSHUA MERRILL.
GEORGE PATTEN.
EDWARD FRANK WOODBURY.

Witnesses:
E. A. HEMMENWAY,
WALTER E. LOMBARD.